(12) United States Patent
Pearce et al.

(10) Patent No.: US 7,711,477 B2
(45) Date of Patent: *May 4, 2010

(54) ELECTRONIC TRACKING AND RANGING SYSTEM

(76) Inventors: Kent Pearce, 6375 San Juan Canyon Rd., San Juan Bautista, CA (US) 95045; Teryl Pratt, 180 Foothill Ct., Morgan Hill, CA (US) 95037

(*) Notice: Subject to any disclaimer, the term of this patent is extended or adjusted under 35 U.S.C. 154(b) by 0 days.

This patent is subject to a terminal disclaimer.

(21) Appl. No.: 12/129,464

(22) Filed: May 29, 2008

(65) Prior Publication Data

US 2008/0224855 A1   Sep. 18, 2008

Related U.S. Application Data

(63) Continuation of application No. 10/773,700, filed on Feb. 6, 2004, now Pat. No. 7,389,180.

(51) Int. Cl.
*G01C 21/00* (2006.01)
(52) U.S. Cl. .................. 701/207; 701/200; 375/140; 375/371
(58) Field of Classification Search ................. 701/207, 701/200; 375/140, 146, 147, 226, 371, 376; 340/573.1, 573.4, 539.13, 825.49
See application file for complete search history.

(56) References Cited

U.S. PATENT DOCUMENTS

| | | | |
|---|---|---|---|
| 5,003,552 A | 3/1991 | Mower | |
| 5,629,678 A | 5/1997 | Gargano et al. | |
| 6,075,442 A | 6/2000 | Welch | |
| 6,243,039 B1 | 6/2001 | Elliot | |
| 6,353,406 B1 | 3/2002 | Lanzl et al. | |
| 6,556,942 B1 | 4/2003 | Smith | |
| 6,724,811 B2 | 4/2004 | Kohli | |
| 6,812,824 B1 | 11/2004 | Golddinger et al. | |
| 6,867,693 B1 | 3/2005 | Radin | |

(Continued)

OTHER PUBLICATIONS

Texas Instruments RFid and SafeTzone Help Family and Friends Play it Safe at Amusement Parks; Nov. 26, 2002; 4 pages; Dallas, TX.
Bruce Felps; Collge Student Article; May 3, 1999; 2 pages.
D. Gerez, E. Guerrero, R. Hacking, M. Lund, D. Park, H. Park, E. Smith, and T. Welton: Theme Park Visitors & Cashless Purchasing: 2 Pages.

*Primary Examiner*—Richard M. Camby
(74) *Attorney, Agent, or Firm*—Glen L. Gross; Shlesinger, Arkwright & Garvey LLP

(57) ABSTRACT

An electronic tracked and ranging system is disclosed. Electronic tracked and ranging system applies interferometer principles to determine ranging distance from a monitor unit 10 to a tracked unit 12. In particular, the system transmits a monitor direct sequence spread spectrum (MDSSS) 52 from a monitor unit 10 to a tracked unit 12. Afterwards, tracked unit 12 transmits a tracked direct sequence spread spectrum (TDSSS) 56. Finally, monitor unit 10 receives TDSSS 56, performs a comparison to a reference MDSSS 52 locks signals between MDSSS 52 and TDSSS 56 and outputs distance between monitor unit 10 and tracked unit 12 using several phase comparisons. Multiple frequencies within MDSSS 52 are phase detected so as to increase accuracy of monitor unit 10 ranging distance to tracked unit 12.

19 Claims, 9 Drawing Sheets

U.S. PATENT DOCUMENTS

| | | |
|---|---|---|
| 7,009,561 B2 | 3/2006 | Menache et al. |
| 2001/0045894 A1 | 11/2001 | Slavin et al. |
| 2002/0080036 A1 | 6/2002 | Rabanne et al. |
| 2002/0101351 A1 | 8/2002 | Lochner |
| 2003/0011478 A1 | 1/2003 | Rabanne et al. |
| 2006/0181393 A1 | 8/2006 | Raphaeli |

ELECTRONIC TRACKING AND RANGING SYSTEM

CROSS REFERENCE TO RELATED APPLICATION

This continuation application claims the benefit of application Ser. No. 10/773,700 filed on Feb. 6, 2004, now U.S. Pat. No. 7,389,180 which is incorporated herein by reference in its entirety and to which priority is claimed.

TECHNICAL FIELD

This invention relates to electronic tracking and ranging system. More specifically, an electronic tracking and ranging system that utilizes phase differences between a monitor reference signal and a signal received from a tracked unit, where multiple frequency components of both monitor reference and tracked unit signals are phase detected to with increasing accuracy determine the range of an object including a tracked unit from a monitor unit.

BACKGROUND ART

There is a need for an improved electronic tracking and ranging system to account for RF signal variations due to RF signal attenuation from energy waves, such as electromagnetic energy, are being reflected off and being dissipated in surrounding areas. Present electronic tracking and ranging systems require a special calibration procedure or special settings so that a user can determine range or track an object within a given area or a given location. In addition, other problems with present electronic tracking and ranging systems for objects include the use of very fine timing intervals for accurate measurements, i.e., within a couple of nanoseconds, and inherent delays in a transponder response time and transponder variations with temperature changes may cause larger ranging variations than the time interval being measured. Thus, there is a need for an improved electronic tracking and ranging system that provides a improved solution to the above problems such as increasing accuracy of locating an object including a tracked unit, even when the transmitted signal is attenuated as well as provide other advantages over present tracking and ranging systems.

DISCLOSURE OF THE INVENTION

In summary, disclosed is an electronic ranging and tracking systems for objects that applies interferometer principles to determine distance between a monitor unit to a tracked unit. In particular, monitor unit transmits a monitor direct sequence spectrum (MDSSS) signal from to a tracked unit. Afterwards, tracked unit receives MDSSS and transmits back to monitor unit a tracked direct sequence spread spectrum (TDSSS). Finally, monitor unit receives TDSSS, preforms a comparison to MDSSS, locks signals between MDSSS and TDSSS, and outputs a at least one phase difference between MDSSS and TDSSS. During the locking process, TDSSS comprising three frequencies, i.e., a carrier frequency, a chipping frequency of pseudo-random noise (PN) sequence, and a repetition frequency of pseudo-random noise (PN) sequence, in which are utilized within monitor unit to calculate ranging distance between tracked unit and monitor unit.

MODES FOR CARRYING OUT THE INVENTION

Figure 1:
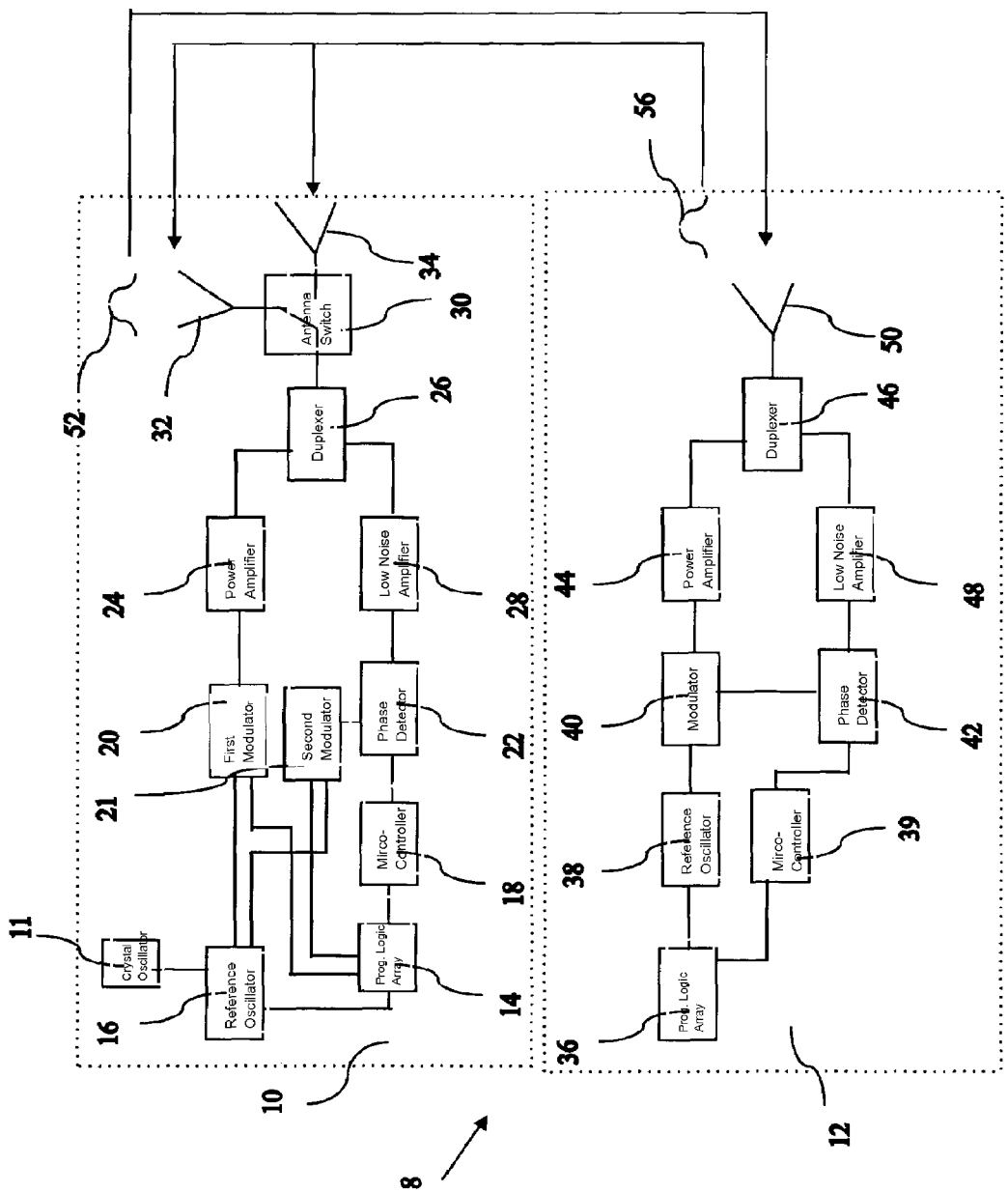
FIG. 1 is the block diagram for an interferometer electronic tracking system of the present invention.

FIG. 1 is the block diagram for an interferometer electronic tracking system 8. Interferometer electronic tracking system 8 comprises a monitor unit 10 and a tracked unit 12. Monitor unit 10 comprises a monitor programmable logic array 14, a monitor reference oscillator 16, a monitor micro-controller 18, a first monitor modulator 20, a second monitor modulator 21, a monitor phase detector 22, a monitor power amplifier 24, a monitor duplexer 26, a monitor low noise amplifier (LNA) 28, an antenna switch 30, a first monitor antenna 32, and a second monitor antenna 34. Tracked unit 12 comprises a tracked programmable logic array 36, a tracked reference oscillator 38, a first tracked modulator 40, a second tracked modulator 39, a tracked phase detector 42, a tracked power amplifier 44, a tracked duplexer 46, a tracked low noise amplifier (LNA) 48, and a tracked antenna 50. Monitor unit 10 transmits a monitor direct sequence spectrum signal (MDSSS) 52 to tracked unit 12 including a monitor reference frequency 70 (see FIG. 6) and a monitor pseudo-random noise (PN) sequence 65 (see FIG. 4). Tracked unit 12 receives MDSSS 52 and transmits to monitor unit 10 a tracked direct sequence spread spectrum (TDSSS) 56 including a tracked reference frequency 72 (See FIG. 6) and a tracked pseudo-random noise sequence 61 (See FIG. 5). Following, monitor unit 10 receives TDSSS 56 and calculates ranging distance between monitor unit 10 and tracked unit 12 using multiple frequency phase comparisons between MDSSS 52 and TDSSS 56.

Figure 2:
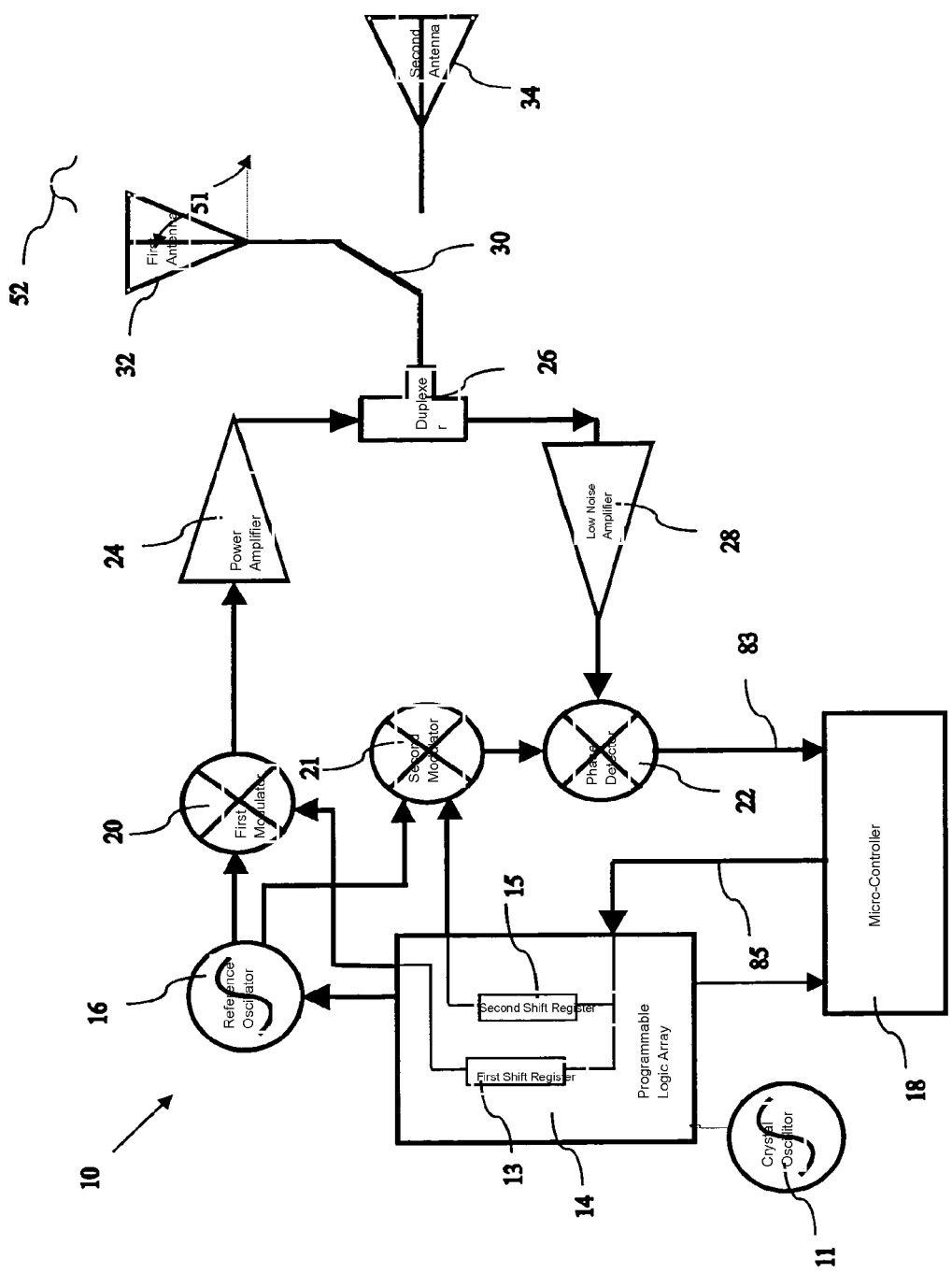
FIG. 2 is a schematic of a monitor unit for the present invention.

FIG. 2 is a schematic of the monitor unit 10 for the interferometer electronic tracking system 8. The monitor unit 10 generates the monitor reference frequency 70 from the monitor reference oscillator 16 such as a voltage-controlled oscillator or the like. The monitor programmable logic array 14 has a phased-lock loop which locks the monitor reference oscillator 16 to a multiple of a clock frequency of the monitor programmable logic array 14. The clock frequency is derived from the crystal oscillator 11. In this embodiment, the monitor reference frequency 70 is a carrier frequency such as a Radio Frequency (RF). Furthermore in this embodiment, carrier frequency is 915 MHz. The monitor reference oscillator 16 output electrically connects to an input port of the first monitor modulator 20. The first monitor modulator 20 functions to modulate the carrier frequency 70 with a monitor direct sequence spread spectrum (MDSSS) signal 52 that will be sent through the monitor power amplifier 24. The MDSSS signal 52 has three components, a monitor first frequency component 57, a monitor second frequency component and a monitor third frequency component also the carrier frequency 70. In the present embodiment, the monitor first frequency component is a repetition rate 57 and the monitor second frequency component is a chipping frequency or chipping rate.

In this embodiment, monitor PN sequence 65 is applied at the rate termed the chipping frequency. Monitor PN sequence 65 modulates carrier frequency to create signal spreading of carrier frequency. In particular, chipping frequency is the rate at which monitor PN sequence spreads the bandwidth of carrier frequency. Also, chipping frequency determines desired monitor frequency bandwidth, where monitor frequency bandwidth is twice the chipping rate. In this embodiment, a 915 MHz carrier frequency with a chipping frequency of 10 MHz generates a monitor frequency bandwidth extending over a frequency range of 905 MHz to 925 MHz. Furthermore, monitor PN sequence 65 has a finite length, which finite length is divided into chipping frequency to yield a repetition rate 57 wherein monitor PN sequence 65 repeats. The length of monitor PN sequence 65 determines this repetition rate 57 because repetition rate 57 is the chipping rate divided by length of monitor PN sequence 65. In this embodiment, a monitor PN sequence 65 with a length of 40 characters results in a repetition rate 57 of 250 kHz. Alternatively, a monitor PN sequence 65 with a length of 133 characters results in a repetition rate of 75.2 kHz Within monitor programmable array 14, monitor PN sequence is created by a spreading sequence originating from a set of "source" registers (not shown in Figure) within monitor programmable array 14. Monitor PN sequence 65 loads into a first shift register 13 and a second shift register 15 within monitor programmable logic array 14, whereby monitor PN sequence is shifted at the chipping rate. In particular, monitor programmable array 14 including first shift register 13 with a digital tap line (not shown in Figure) controlled by monitor micro-controller 18 to spread monitor PN sequence at chipping frequency, outputting a single bit value of shifted monitor PN sequence to first monitor modulator 20. Additionally, monitor programmable logic array 14 includes second shift register 15 with a digital tap line (not shown in Figure) controlled by monitor micro-controller 18 to spread monitor PN sequence 65 at chipping frequency, outputting a single bit value of shifted version of monitor PN sequence 65 to second monitor modulator 21. Each time first shift register 13 and second shift register 15 have a shifted version of monitor PN sequence 65 a number of times equal to the length of monitor PN sequence 65, first shift register 13 and second shift register 15 are re-loaded from the respective "source" registers (not shown in Figure).

Following, monitor direct sequence spread spectrum signal (MDSSS) 52, i.e., monitor signal, is electrically connected to a monitor power amplifier 24 to boost monitor signal strength. Monitor power amplifier 24 sends monitor signal 52 through monitor duplexor 26, such as a Mini-circuits RCT-12-4-75 or a functional equivalent, directing monitor signal 52 to first monitor antenna 32, such as a circuit board patch antenna, for transmission to tracked unit 12. Preferably, monitor reference oscillator 16, monitor modulator 20, and monitor power amplifier 24 functional blocks would be contained in one electronic circuit such as a Phillips SA900 or a functional equivalent.

Figure 3:
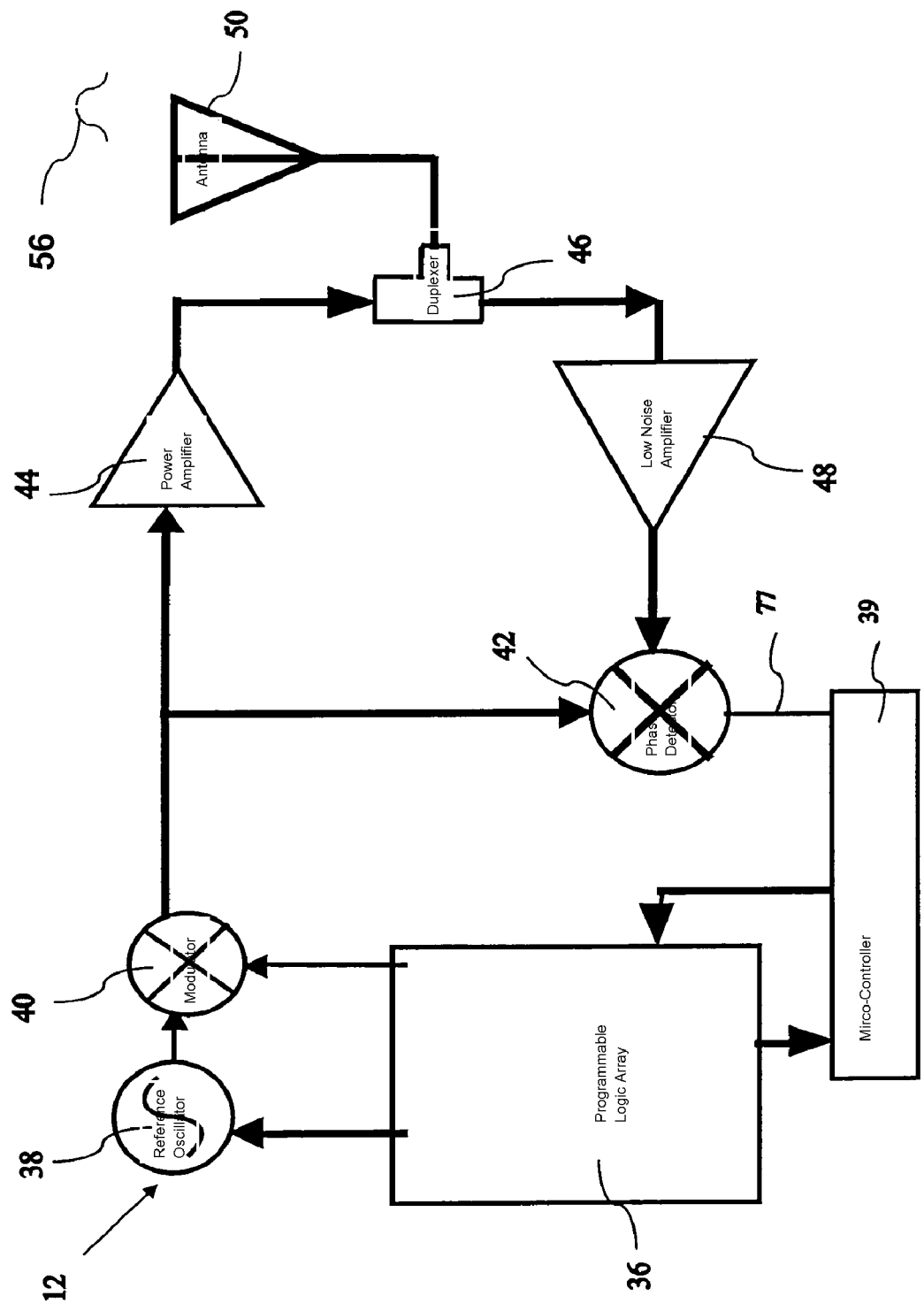
FIG. 3 is a schematic of a tracked unit for the present invention.

FIG. 3 is a schematic of a tracked unit. Tracked unit 12 is a transponder. A tracked antenna 50 on tracked unit 12 receives monitor signal 52. Preferably, tracked antenna 50 is a circuit board patch antenna. Tracked duplexer 46, such as Minicircuits RCM 12-4-75 or alternatively a functional equivalent, electrically connects MDSSS 52 to a tracked low noise amplifier (LNA) 48, such as Agilent ABA-51563 or a functional equivalent, for signal amplification. Afterwards, monitor PN sequence transmitted within monitor signal 52 is mixed with tracked PN reference sequence within a tracked phase detector, in which in this embodiment is a tracked mixer 42, such as Minicircuits ADE-2 or a functional equivalent. Tracked mixer 42 generates a tracked PN error sequence 77, which tracked PN error sequence 77 is transmitted to a tracked programmable logic array 36, such as an Altera EP1C3 or a functionally equivalent circuit.

Tracked programmable logic array 36 shifts tracked PN sequence 61 and outputs a shifted version of tracked PN sequence 61 to a first tracked modulator 40 and to a second tracked modulator 39. Second tracked modulator 39 outputs shifts tracked PN sequence 61, which shifted version of tracked PN sequence 61 is input to tracked mixer 42, wherein tracked PN error sequence 77 is again regenerated. Afterwards, the above steps are repeated until tracked PN sequence 61 locks with monitor PN sequence 65. As such, the above steps of regenerating monitor PN sequence within tracked unit 12 to adjust for phase errors generated within tracked unit 12, avoids phase inaccuracies introduced by conventional transponders that don't regenerate monitor PN sequence 65. After locking between tracked PN sequence 61 and monitor PN sequence 65 occurs, tracked modulator 40 outputs a tracked direct sequence spread spectrum signal (TDSSS), i.e., tracked signal 56, outputting tracked signal 56 though tracked amplifier 44. Tracked amplifier 44 electrically connects to tracked antenna 50 through tracked duplexor 46 for transmitting TDSSS 56 to monitor unit 10.

TDSSS signal 56 embodies three frequencies, a first frequency component or the tracked reference frequency 72, a second frequency component 61 and a third frequency component 55. In the present embodiment, the first frequency component is a carrier frequency 72 (FIG. 6), the second frequency component is a chipping frequency 61 (FIG. 5), and the third frequency component is a repetition rate 55 (FIG. 4) (i.e., the rate of repetition of monitor PN sequence). These three frequencies have an associated wavelength for one complete cycle. Using monitor phase detector 22 measurements, a user compares phase of tracked signal 56 to monitor signal 52 for various frequency components. These phase differences between tracked signal 56 and monitor signal 52 is used to determine ranging distance between monitor unit 10 and tracking unit 12. The ranging distance results from that portion of the wavelength that corresponds to a proportion of a phase difference as compared with a full cycle, i.e., 360 degrees. Coarse distance calculation is done with the largest wavelength frequency. Afterwards, coarse distance calculation is used in conjunction with a smaller wavelength frequency component to determine with increased accuracy the ranging distance for the portion of the distance that is in excess of an integer number of wavelengths. Prior art would have counted within a digital counter the number of frequency intervals that are repeated while this present invention would compare phase shift between different frequencies of the TDSSS signal 56 and the MDSSS signal 52, and use these phase differences of each frequency component for measuring ranging distance between tracked unit 12 and monitor unit 10.

Referring to FIG. 2, a first monitor antenna 32 and a second monitor antenna 34 receives tracked signal 56. In this embodiment, first monitor antenna 32 and second monitor antenna 34 are cross-polarized. Antenna switch 30 selects first monitor antenna 32. Tracked signal 56 received by first monitor antenna 32 electrically connects to monitor duplexer 26, which directs tracked signal 56 to monitor low noise amplifier 28 for boosting signal level. Afterwards, tracked signal 56 is frequency mixed with monitor signal 52 to generate a monitor PN error signal 83. Monitor PN error signal 83 is electrically connected to monitor micro-controller 18. Monitor micro-controller 18 generates a monitor PN shift control 83 which is electrically connected to monitor programmable logic array 14. Monitor programmable logic array 14 shifts monitor PN sequence 65 and applies a shifted version of monitor PN sequence 65 (FIG. 5) to second modulator 21 that connects to monitor mixer 22. In this embodiment, monitor PN sequence 65 has a repetition rate 57, i.e., monitor first frequency component, of 250 kHz.

Figure 4:
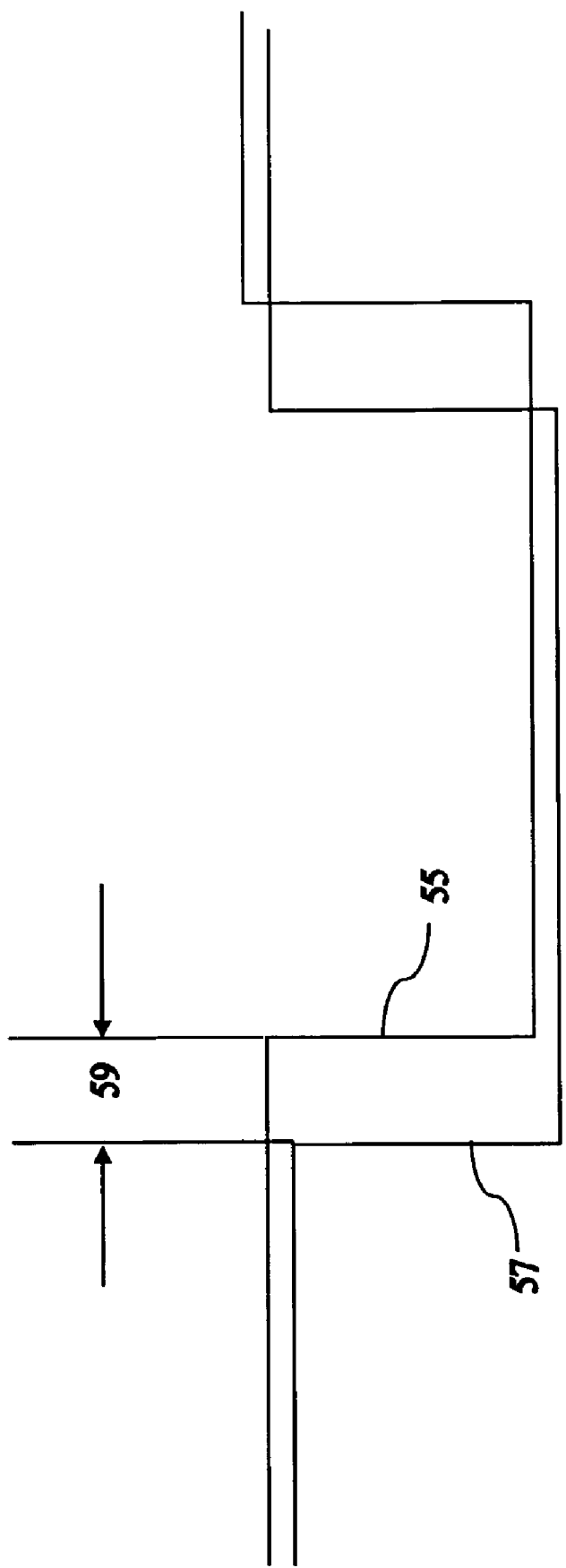
FIG. 4 illustrates a first phase comparison of monitor unit of the present invention.

FIG. 4 illustrates first phase comparison technique of monitor unit 10 interferometer of present invention. In particular, detection of TDSSS 56 involves shifting monitor repetition rate 57 until it locks with tracked first frequency component 55 of TDSSS 56. As explained above in paragraph [0002] monitor programmable logic array 14 implements a first shift register 13 (shown in FIG. 2) and a second shift register 15 (Shown in FIG. 2) and a digitally controlled tap (not shown in Figure) along each shift register to calculate a first phase difference 59 between tracked first frequency component 55 relative to monitor repetition rate 57, i.e., monitor first frequency component. Afterwards, first phase comparison is repeated until tracked first frequency component 55 locks with monitor repetition rate 57. In this embodiment, within monitor programmable logic array 14, a phase comparison is made between a tracked first frequency 55 component, i.e., a 250 KHz and a monitor repetition rate 57 of 250 KHz using a first shift register 13 and second shift register 15, as shown in FIG. 2, to calculate first phase difference 59.

First phase difference 59 determines a coarse measure of ranging distance between tracked unit 12 and monitor unit 10. In this embodiment, a first frequency comprising a 250 kHz reference frequency has roughly a wavelength in free space of 4,000 feet. As such, first phase difference 59 is appropriate for creating a ranging distance error between monitor unit 10 and tracked unit 12 of less than 4000 feet. In practice, monitor mixer 22 generates a PN phase error, typically around 5 degrees, which gives a first phase difference measurement ranging distance error of over 55 feet. Thus, we still need more accurately of ranging distance between tracked unit 12 and monitor unit 10.

Figure 5:
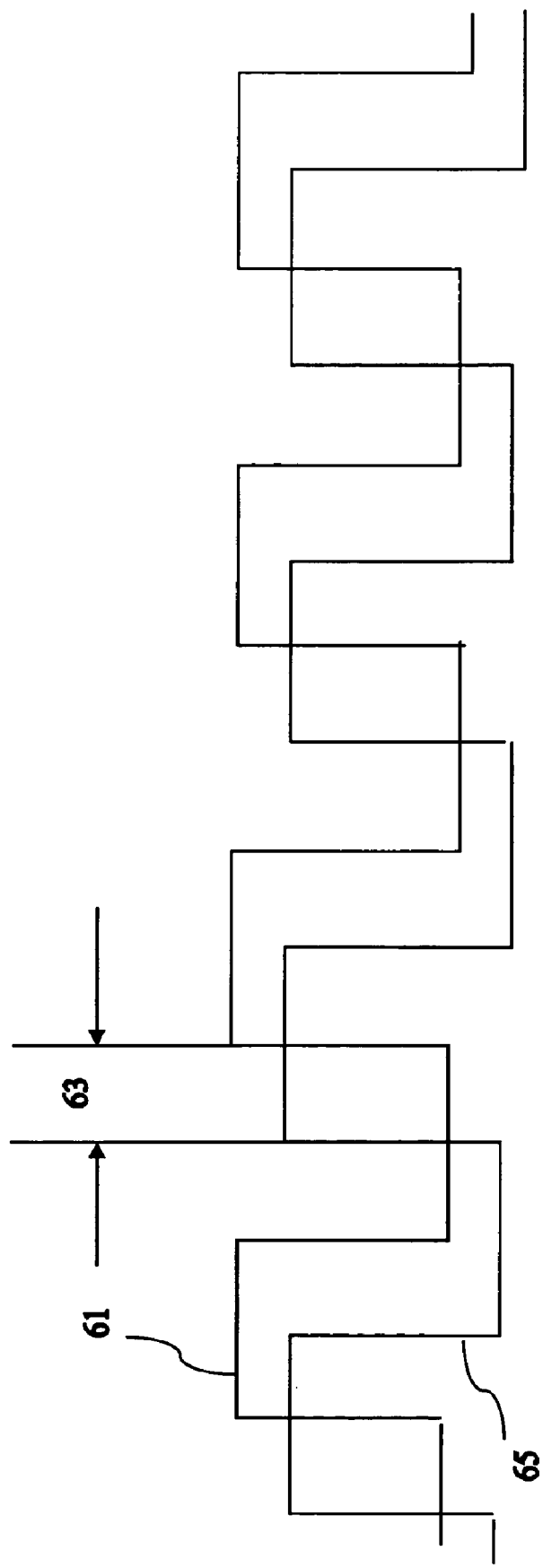
FIG. 5 illustrates a second phase comparison of a monitor unit of the present invention.

FIG. 5 illustrates a second phase comparison of a monitor unit 10 of the present invention. As such, to achieve more accuracy, we need to a use a second tracked frequency 61 of TDSSS 56 having a medium wavelength. As such monitor programmable logic array 14, a second phase comparison is made between a monitor PN sequence 65 (a second monitor frequency component) having a chipping frequency of 12 MHz compared to TDSSS 56 including a second tracked frequency component 61, which is in this embodiment a 12 MHz signal, to generate a second phase difference 63. Second phase difference 63 used in conjunction with first phase difference 59 to increase accuracy of determining distance between tracked unit 12 and monitor unit 10. For example, second tracked frequency component 61, which second tracked frequency component 61 has a wavelength of about 69 feet, which determines the number of cycles of 69 feet involved in determining ranging distance of tracked unit 12. Prior art would have counted pulses by determining the number of constructive and destructive phase differences between a reference signal and received signal while the present invention uses more than one phase detection. More specifically, this invention uses more than one phase detection to measure with increasing accuracy, i.e., with increasingly more accurate discrete steps, to generate ranging distance between tracked unit 12 and monitor unit 10.

Figure 6:
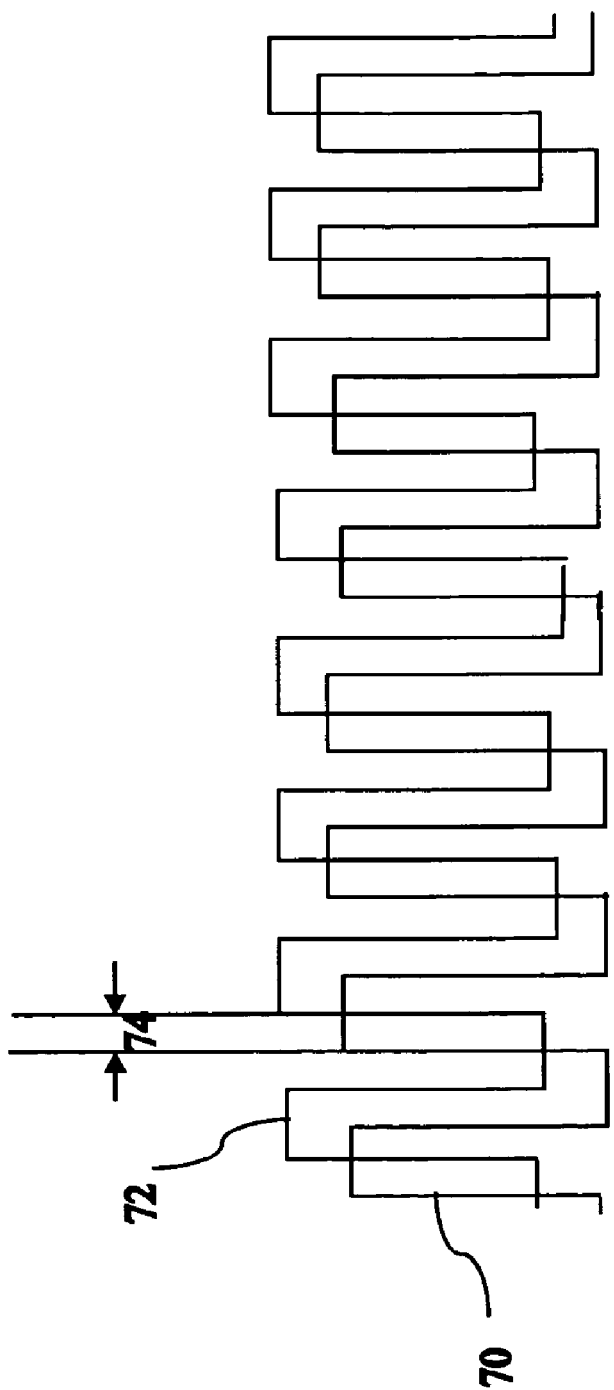
FIG. 6 illustrates a third phase comparison of a monitor unit of the present invention.

FIG. 6 illustrates a third phase comparison of a monitor unit 10 of the present invention. To achieve even more accuracy, this step involves using a third tracked frequency component 72, i.e. 900 MHz band, of the TDSSS 56, where monitor programmable logic array 14 performs a third phase comparison between monitor reference frequency 70, i.e., monitor third frequency component, which in this embodiment is carrier frequency, and a tracked third frequency component 72, outputting a third phase difference 74, wherein carrier frequency has a wavelength on the order of 1 foot. This third phase comparison provides very fine step resolution in conjunction with course phase error 59 to increase calculation accuracy of tracked unit ranging distance from monitor unit.

Referring to FIG. 2, a measurement of a received signal strength indication (RSSI) from first monitor antenna 32 is made based on amplitude difference between monitor signal and TDSSS 56. Following, antenna switch 30 connects second monitor antenna 34 and amplitude difference again RSSI is calculated between monitor signal 52 and TDSSS 56. A difference is calculated between first monitor antenna 32 and second monitor antenna 34 received power levels to determine if tracked unit 12 getting closer to monitor unit 10. From this difference in first monitor antenna 32 measured power and second monitor antenna 34 measured power, a relative angle of tracked unit 12 is determined in relation to monitor unit 10. As such, the ratio of power from first monitor antenna 32 to second monitor antenna 34, minus first monitor antenna loss and second monitor antenna loss, equates to the tangent of an angle 51 relative to axis of first monitor antenna 32.

Figure 7:
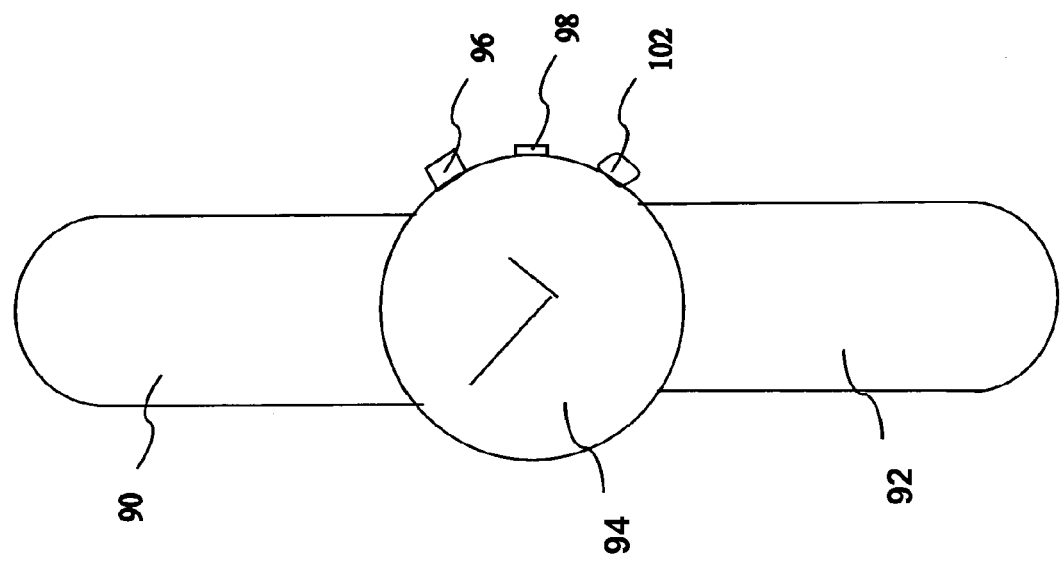
FIG. 7 illustrates a front view of a housing for a tracked unit for the present invention.

FIG. 7 illustrates a front view of a housing for a tracked unit for the present invention. A tracked unit 12 (not shown) is disposed an integrated circuit that is placed within tracked unit housing 94 where first strap 90 and second strap 92 are attached to a person to be tracked, such as a child. Further, first button 96 activates or deactivates the tracked unit (not shown). In this embodiment, the tracked unit housing 94 includes a working watch where second bottom 98 sets the watch time and third button 102.

Figure 8:
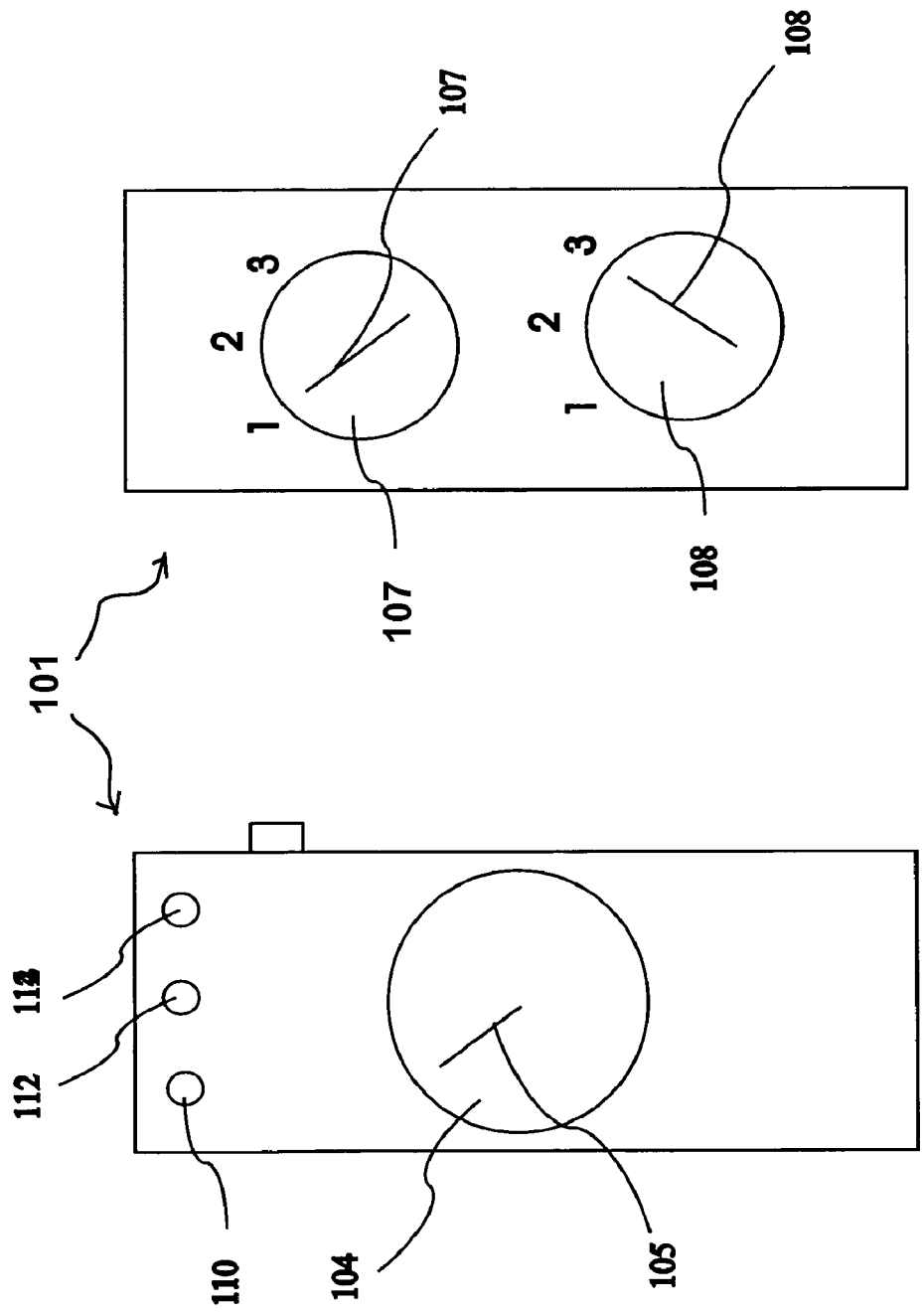
FIG. 8 illustrates a front view and a back view of a housing for a monitor unit for the present invention.

FIG. 8 illustrates a front view and a back view of a housing for a monitor unit for the present invention. A monitor unit 10 (not shown in Figure) is disposed on an integrated circuit (not shown in Figure) placed within monitor unit housing 101, where monitor micro-controller 18 is electrically connected to a monitor compass 104, such as a Liquid Crystal Display (LCD), which monitor compass hand 105 display location of a tracked unit 12 (not shown in Figure). A user may adjust a first range adjustment dial 107 and a second range: adjustment dial 108, allowing a user to select a zone, whereby monitor unit 10 tracks a tracked unit 12 (not shown in Figure).

Figure 9:
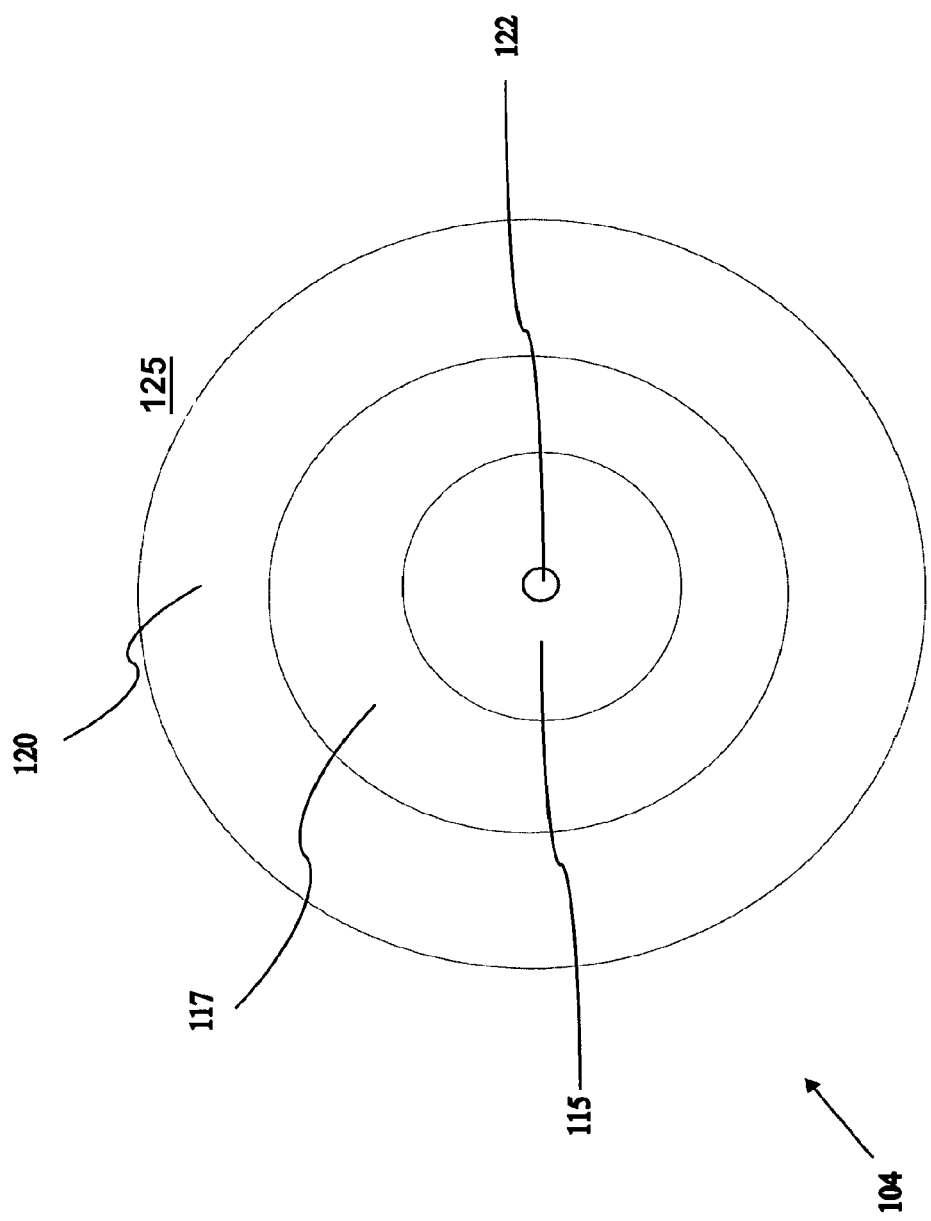
FIG. 9 illustrates a display unit for a monitor unit of the present invention.

FIG. 9 illustrates a display unit for a monitor unit of the present invention. In this embodiment, there are four zones of coverage. Each zone shows a user a relative distance between a monitor unit and a tracked unit. A first zone 115, i.e., safe zone, means a tracked unit 10 is within close range of a monitor unit 10. In this Figure, object 122 including a tracked unit 12 (not shown) is within safe zone 115 and first light 110 (shown in FIG. 8) is lit displaying that object 122 is within safe zone 115. In the alternative, if an object including a tracked unit (not shown in Figure) was within a second zone 117, which is a first ring of coverage away from safe zone 115, a second light 112 (shown in FIG. 8) would be lit. In yet another alternative, if an object including a tracked unit 12 (not shown in Figure) is within a third zone 120, a third light 118 (shown in FIG. 8) would be lit. In yet a further alternative, fourth zone 125 is the area outside of third zone 120 of coverage. As such, each ring of coverage, i.e., second zone 117 and third zone 120 are concentric rings of coverage to alert a user of a relative change in ranging distance of said monitor unit 10 (FIG. 1) to said tracked unit 12 (FIG. 1).

Information herein shown and described in detail is fully capable of attaining the above-described object of the invention and the present embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, one skilled in the art should recognize that various changes and modifications in form and material details may be made without departing from the spirit and scope of the inventiveness as set forth in the appended claims. No claim herein is to be construed under the provisions of 35 U.S.C. § 112, sixth paragraph, unless the element is expressly recited using the phrase "means for."

INDUSTRIAL APPLICABILITY

This invention applies industrially to an electronic tracked and ranging system. More specifically, the present invention applies industrially to an object ranging and tracked system that utilize phase differences between monitor reference signal and monitor received signal from multiple frequency bands to increase accuracy of locating objects. The present invention reduces positioning accuracy due to surrounding area.

What is claimed is:

1. An electronic system for locating an object comprising:
    a monitoring unit;
    a tracked unit placed on said object receiving a monitor digital spread spectrum signal (MDSSS) from said monitoring unit and transmits a tracked digital spread spectrum signal (TDSSS) to said monitoring unit; and
    a first phase detector placed on said monitor unit to compare a first frequency component of said tracked digital spread spectrum signal to a monitor first frequency component creating a first phase difference utilized for a coarse accuracy determination of said object ranging distance to said monitor unit.

2. An electronic system as recited in claim 1, further comprising:
    a second phase detector included within said monitor unit that compares a tracking second frequency component of said TDSSS with a monitor second frequency component to create a second phase difference; and,
    a first detector phase error output determines number of repeated frequency periods of said second frequency component of TDSSS for a medium accuracy determination of range relative to said monitor unit of said object range.

3. An electronic system as recited in claim 2, further comprising:
    a third phase detector comparing a third frequency of said TDSSS with a monitor third frequency component to create a third phase difference; and
    an output of second phase detector determines number of repeated frequency cycles of said tracked third frequency of said TDSSS for fine accuracy determination. of range relative to monitor unit of said object.

4. An electronic system as recited in claim 1, wherein said first frequency of said TDSSS is a repetition rate of said tracked pseudo-random noise sequence and said first monitor frequency component is a repetition rate of said monitor pseudo-random noise sequence.

5. An electronic system as recited in claim 1, wherein said second frequency component of said TDSSS is chipping frequency of said tracked pseudo-random sequence and said second frequency component of said MDSSS is a chipping frequency of said tracked pseudo-random sequence.

6. An electronic system as recited in claim 1, wherein said third frequency component of said TDSSS is a carrier frequency and said third frequency component of said MDSSS is a carrier frequency.

7. An electronic system as recited in claim 1, wherein said monitor unit comprises a first monitor antenna disposed on said monitor unit and a second monitor antenna disposed on said monitor unit, which said first monitor antenna is cross-polarized relative to said second monitor antenna for measuring said object range and relative angle from said monitor unit.

8. An electronic system as recited in claim 1, wherein said second frequency component of said TDSSS is a pseudo-random noise sequence input into a first shift register circuit and a second shift register circuit, creating said first phase difference between said first frequency component of TDSSS and said second frequency component of said MDSSS.

9. An electronic system as recited in claim 1, wherein said tracked unit receives a monitor carrier frequency from said monitor unit, wherein said tracked unit includes a phase lock loop that locks said MDSSS with said TDSSS.

10. An electronic system as recited in claim 1, wherein said monitor unit further comprises a monitor compass which displays location of said tracked unit within several concentric rings to provide a visual display for a user of said ranging distance between said monitor unit and said tracked unit.

11. An electronic system as recited in claim 1, wherein said monitor unit further comprises a monitor compass which displays location of said tracked unit and a user selects one zone from several concentric rings of coverage from said monitor unit to said tracked unit.

12. An electronic system for locating an object comprising:
    a monitoring unit;
    a tracked unit placed on said object receiving a monitor digital spread spectrum signal (MDSSS) from said monitoring unit and transmits a tracked digital spread spectrum signal (TDSSS) to said monitoring unit;
    a first phase detector placed on said monitor unit to compare a first frequency component of said tracked digital spread spectrum signal to a monitor first frequency component creating a first phase difference utilized for a coarse accuracy determination of said object distance ranging relative to said monitor unit;
    a second phase detector included within said monitor unit that compares a second frequency component of said tracked digital spread spectrum signal with a monitor second frequency component to create a second phase difference;

a first detector phase error output determines number of repeated frequency periods of said second frequency component for a medium accuracy determination of range relative to monitor unit of said object range;

wherein said first frequency component of said TDSSS is a repetition rate of said tracked pseudo-random noise sequence; and, wherein said second frequency component of said TDSSS is chipping frequency of said tracked pseudo-random (PN) sequence.

13. An electronic system as recited in claim 12, further comprising:

a third phase detector comparing a third frequency of said TDSSS with a monitor third reference signal to create a third phase difference; and, an output of second phase detector determines number of repeated frequency cycles of said third frequency component of said TDSSS for fine accuracy determination of distance ranging between said monitor unit and said object including said tracked unit.

14. An electronic system as recited in claim 12, wherein said third frequency component of said TDSSS is a carrier frequency and said third frequency component of said MDSSS is a carrier frequency.

15. An electronic system as recited in claim 12, wherein said monitor unit comprises a first monitor antenna disposed on said monitor unit and a second monitor antenna disposed on said monitor unit, which said first monitor antenna is cross-polarized relative to said second monitor antenna for measuring said object range and relative angle from said monitor unit.

16. An electronic system as recited in claim 12, wherein said second frequency component of said TDSSS is a pseudo-random noise sequence input into a first shift register circuit, creating said first phase difference between said first frequency component of said TDSSS and said monitor pseudo-random noise sequence.

17. An electronic system as recited in claim 12, wherein said monitor unit further comprises a monitor compass which displays location of said tracked unit and a user selects one zone from several concentric rings of coverage to monitor said tracked unit.

18. A method for detecting the range of an object comprising:

placing a tracked unit on said object;

transmitting a monitor digital spread spectrum signal (MDSSS) from a monitoring unit;

receiving said MDSSS at said tracked unit;

transmitting from said tracked unit a tracked digital spread spectrum signal (TDSSS) to said monitoring unit;

comparing a first frequency component of said TDSSS to a first frequency component of said MDSSS within a first phase detector; and, outputting a first phase shift for course accuracy determination of said object range relative to said monitor unit.

19. The method of claim 18, further comprising the steps of:

comparing a second frequency of said TDSSS to a second reference signal of said MDSSS within a second phase detector;

outputting a second phase shift;

determining the number of repeated frequency periods of said second frequency of said TDSSS.

* * * * *